United States Patent

[11] 3,609,117

[72] Inventors William H. Deis
Belmont;
Wesley Werner Ness, San Bruno; Gerald Bohm, Sacramento, all of Calif.
[21] Appl. No. 9,092
[22] Filed Feb. 6, 1970
[45] Patented Sept. 28, 1971
[73] Assignee Merck & Co., Inc.
Rahway, N.J.
Continuation of application Ser. No. 587,658, Oct. 19, 1966, now abandoned.

[54] POLYESTER RESINS AND PROCESSES FOR PREPARING SAME
4 Claims, No Drawings
[52] U.S. Cl. .................................................. 260/40 R, 106/306
[51] Int. Cl. ........................................................ C08k 1/06
[50] Field of Search ........................................... 260/40; 106/306

[56] References Cited
UNITED STATES PATENTS
| | | | |
|---|---|---|---|
| 2,628,209 | 2/1953 | Fisk ............................. | 260/40 |
| 3,131,148 | 4/1964 | Taulli .......................... | 252/28 |
| 3,467,719 | 9/1969 | Raichle et al. ................ | 260/40 |

Primary Examiner—Morris Liebman
Assistant Examiner—S. M. Person
Attorneys—I. Louis Wolk and J. Jerome Behan ABSTRACT: Magnesia having an iodine number greater than 100, a particle size of 0.4-3 microns, and containing about 86-96 weight percent of MgO for use as a chemical thickening agent in polyester resin systems.

POLYESTER RESINS AND PROCESSES FOR PREPARING SAME

This application is a continuation of application Serial No. 587,658, now abandoned.

This invention concerns a novel form of magnesia, a novel polyester resin system containing said magnesia, and a process for preparing said novel polyester resin system. More particularly, this invention concerns a polyester resin system which undergoes a rapid increase in viscosity at ambient temperature, a method for preparing this resin system, and the particular magnesia useful in preparing such a resin system.

Polyester resins find use in the preparing of various articles of manufacture such as appliances, boats, automotive parts, and devices for electrical equipment. During the preparation of such articles, it has been found desirable to impart additional physical properties to the polyester resin used so as to permit efficient and technically superior production techniques. The use of a polyester-magnesia composition which rapidly increases in viscosity is an important factor in permitting the desired production techniques. The more rapid increase of viscosity permits the resulting thickened polyester to be used sooner after mixing and thereby reduces the amount of material held in inventory; this affords production economies. It is known in the art to use magnesia to increase the viscosity of polyester resins. This invention is concerned with compositions and procedures for improving the rate of viscosity increase in polyester resins thickened with magnesia. This improved rate of viscosity increase is an important aspect of the present invention.

It is an aspect of this invention to provide magnesia of a nature such that its addition to polyester resin causes a surprisingly rapid viscosity increase in the composition obtained. A further object is provision of a method of making a polyester composition having improved properties. It is another object of this invention to provide an improved polyester composition containing magnesia specially suited to insure a surprisingly beneficial viscosity-time relationship. Other objects will become apparent from the following description of the invention.

In accordance with this invention, there is prepared a novel magnesia of particle size and surface characteristics not heretofor available. The magnesia of this invention is preparable from material having the same chemical composition but of significantly different particle size and surface area. The novel magnesia of the desired particle size and porosity may be prepared from Maglite D 3231, a grade of magnesia available from the Marine Magnesium Division of Merck & Co., Inc. This material has the following typical analysis: magnesium oxide, 92.84 weight percent; ignition loss, 4.86 weight percent; carbon dioxide, 4.86 weight percent; combined water, 4.62 weight percent; calcium oxide, 0.55 weight percent; silicon dioxide, 0.27 weight percent; chloride, 0.17 weight percent; sulfate, 0.68 weight percent; iron oxide, 0.03 weight percent; aluminum oxide, 0.10 weight percent; manganese, 0.0020 weight percent; copper, 0.0002 weight percent; acid insoluble, 0.05 weight percent. The magnesia starting material may be jet milled using standard jet mill equipment such as a Fluid Energy and Equipment Co. Jetomizer. This starting material is then forced through the Jetomizer at a pressure of about 90 p.s.i.g. to produce the novel magnesia of this invention. Dry air at about 500° F. is used to provide the desired pressure.

In accordance with this invention, the novel magnesia has a large and particularly active surface. When measured by use of the standard well-known test, the surface area of this novel magnesia has an iodine number greater than 100. It will be understood that iodine member represents the number of milliequivalents of iodine adsorbed per hundred grams of magnesia sample.

The novel magnesia here found to impart desirable physical properties to polyester resins compositions is possessed of an average particle size in the order of about 0.1–7 microns, preferably 0.4–3 microns, and still more preferable 0.4–1.2 microns. Any standard and accurate method is suitable in ascertaining the particle size. For instance, the ultra centrifuge technique using a Mine Safety Appliance Co. Whitby Centrifuge may be successfully utilized. Such method of measuring particle size is commonly known as the MSA-Whitby method for particle size determination.

It has also been found in accordance with this invention that magnesia having certain quantities of individual chemical components is suited to provide polyester resins with the desired viscosity characteristics. The magnesia with which this invention is concerned is 86–96 weight percent pure magnesium oxide. However, it is preferred that the particle of magnesia utilized contain about 89–σweight percent pure magnesium oxide. The magnesia of this invention also contains 1.5–11.5 weight percent of combined water, preferably 3.5–8.5 weight percent.

The preferred bulk density for the novel magnesia of the present invention is 5–14 pounds per cubic foot, the preference being for the purposes of transportation and handling, rather than the effect upon the polyester. Consequently, such bulk density is in no way a critical aspect of this invention.

In accordance with an additional aspect of this invention, the novel magnesia above described is blended with polyester resin. About 0.2–10 weight percent and preferably 0.4–3 weight percent of magnesia may be employed. The resulting material, a thickened polyester resin, has desirable physical characteristics, particularly the ability to attain high viscosity in a relatively short time. For instance, certain of the thickened polyester resins of the present invention attain viscosities of 100 poise at room temperature in about 24 hours, whereas otherwise identical thickened polyesters containing other magnesias may require about 5 days to attain this same viscosity. Moreover, certain of the thickened polyesters of the present invention permit the obtaining of viscosities of about 10,000 poise without addition of any filler, whereas otherwise identical thickened polyesters containing the same weight percent of ordinary magnesia are incapable of attaining this viscosity at all, particularly without the addition of large quantities of sometimes undesirable filler.

The novel compositions of matter which are here called thickened polyesters are particularly useful in the preparation of objects and articles of manufacture where low tackiness and smooth finishes are desired. The composition may also contain fillers such as are normally used in the art for making articles prepared from polyesters. Such fillers include barytes, ground silica, magnesium carbonate, ditamaceous earth, glass fiber, hydrated alumina, and the like.

The magnesia is conveniently incorporated into polyester resin by intimately admixing it with the polyester using a high-speed, high-shear mixer. The magnesia may also be admixed to a vehicle to form a dispersion. A Cowles Dissolver is useful in preparing such dispersion. A dry form of the magnesia may also be added to the polyester. The magnesia is readily admixed with the polyester using a laboratory stirrer operating at about 4–6,000 revolutions per minute. The entire mixing procedure may take place at room temperature.

The polyester starting materials employed in this invention are polymerizable resin compositions derived from the product obtained by dissolving a precondensed linear polymer in a monomeric polymerizable compound containing an ethylenic bond and capable of cross linking the linear polymer into a rigid three-dimensional gel. The linear polymer is a polymeric ester produced by the recurring condensation of a dicarboxylic acid (aromatic or ethylenic) with a polyol such as propylene glycol or glycerol. The monomeric polymerizable compound used for cross linking contains an ethylenic grouping, preferably attached to a phenyl group as in styrene, alpha-methyl styrene or divinyl benzene. As examples of some of the resins within the above description there may be mentioned Stypol 40-2417 (Freeman Chemical Co.); Selectron RS 5003, Selectron 5156, Selectron 50012, Selectron RS 5119 (Pittsburg Plate Glass Co.); Plaskon 9520 (Allied Chemical Co.); and the like.

When admixed with the novel magnesia of the present invention, the above polyesters provide a composition having enhanced physical properties particularly beneficial in the production of various articles of manufacture. This composition is of sufficiently low viscosity shortly after preparation to completely wet a filler. Thereafter, the novel polyester-magnesia composition becomes highly viscous, permitting easy handling, ready storage and convenient use of direct molding techniques. The obtaining of this highly viscous thickened polyester at an enhanced rate permits substantial savings of both time and expense during the preparation of the molded articles.

The reason for the surprising viscosity increase in the thickened polyester resin is not clearly understood. Although we do not wish to be bound by the theory involved, it is believed that physical phenomena, such as colloidal effects or gelling, imparts some of the unusual viscosity characteristics to the thickened polyester compositions of this invention.

The following examples are given for the purpose of illustration and not by way of limitation:

EXAMPLE 1

The novel magnesia of the present invention (2 percent by weight) is blended with the polyester resin, Stypol 40-2417, by use of a laboratory stirrer operating at 5,000 revolutions per minute. For convenience, the magnesia may be dispersed in a nonreactive vehicle such as a plasticer before addition to the polyester, although this is not essential.

The novel magnesia used had an average particle size of about 0.6 microns and an iodine number of 155. The magnesia contained about 90 weight percent of MgO. A second magnesia which is known in the art (Type "A") is blended with the Stypol polyester in the same manner as described above. Again 2 percent by weight of magnesia is used. Type A magnesia is approximately of the same state of purity as the magnesia of this invention, has an average particle size of 4.0 microns and has an iodine absorption number of 95. The polyester composition containing the novel magnesia and that containing Type A magnesia are allowed to stand at ambient temperature, and the viscosity in poise is measured at the indicated intervals, using a Brookfield Viscometer. The following results are obtained:

Table I

| Hours After Blending | Viscosity, Poise | |
|---|---|---|
| | Novel Magnesia | Type A Magnesia |
| 8.5 | 500 | 320 |
| 23 | 7,700 | 4,570 |
| 30 | >10,000 | 6,400 |

It will be seen that the polyester containing the novel magnesia has substantially greater viscosity than that prepared from magnesia of larger particle size and smaller surface area.

EXAMPLE 2

The novel magnesia of this invention and Type B magnesia are intimately blended as in example 1 with a polyester commercially known as Plaskon 9520 manufactured by Allied Chemical Co. Two percent by weight of magnesia is employed. The novel magnesia has an average particle size of 0.6 microns and an iodine absorption number of 155 whereas the Type B magnesia has a particle size of 13 microns and an iodine absorption number of 135. The following viscosities are measured after the indicated number of days after blending.

Table II

| Days at Ambient Temp. | Viscosity, Poise | |
|---|---|---|
| | Novel Magnesia | Type B Magnesia |
| 1.5 | 890 | 515 |
| 3 | 1,050 | 645 |
| 6 | 1,430 | 890 |
| 12 | 3,800 | 1,820 |

It is clear from the above example that even with magnesia of comparable surface area, the larger particle size reduces the desired beneficial viscosity buildup.

EXAMPLE 3

The novel magnesia and Type B magnesia (described in example 2) separately are intimately admixed with Selectron 50012 polyester resin obtained from the Pittsburgh Plate Glass Co. The magnesia polyester resin composition is tested for viscosity increase and the following results are noted:

TABLE III

| | Weight percent magnesia in resin | | | |
|---|---|---|---|---|
| | 2 | | 5 | |
| | Viscosity, poise | | | |
| Type of magnesia | Novel magnesia | Type "B" | Novel magnesia | Type "B" |
| Hours at ambient temperature: | | | | |
| 2 | 57 | 50 | 91 | 60 |
| 4 | 68 | 53 | 163 | 74 |
| 7 | 104 | 65 | 392 | 128 |
| 9 | 142 | 72 | 1,040 | 211 |
| 11 | | | | |
| 12 | 350 | 136 | 2,760 | 918 |
| 23 | | | | |
| 24 | 480 | 277 | 5,550 | 3,140 |
| 33 | | | | |
| 36 | 1,200 | 580 | 9,200 | 5,550 |
| 52 | | | | |
| 51 | 1,920 | 530 | | |

EXAMPLE 4

The magnesia of the present invention and Type B magnesium oxide discussed above are separately blended as in example 1 with each of three different types of Selectron polyester resins which were obtained from Pittsburgh Plate Glass Co. In each instance, 2.0 weight percent of magnesia is used. The following table shows the results obtained for the indicated number of hours after the addition of the magnesium oxide to the resin.

The greater viscosity displayed by the magnesia-polyester compositions using the novel magnesia is clearly evident. In some instances, over a fiftyfold increase in viscosity is shown over that obtainable with type B magnesia.

TABLE IV

| Type of magnesia | Resin type | | | | | |
|---|---|---|---|---|---|---|
| | Selectron RS 5003 | | Selectron 5156 | | Selectron RS 5119 | |
| | Novel magnesia type B, viscosity, poise | | | | | |
| Hours at ambient temperature: | | | | | | |
| 2 | 22 | 17 | 53 | 45 | 13 | 12 |
| 4 | 30 | 18 | 65 | 50 | 18 | 13 |
| 7 | 56 | 23 | 102 | 57 | 27 | 16 |
| 9 | 72 | 27 | | | | |
| 11 | | | 166 | 74 | 40 | 21 |
| 12 | 157 | 36 | | | | |
| 23 | | | 260 | 110 | 80 | 30 |
| 24 | 2,460 | 53 | | | | |
| 33 | | | 658 | 163 | 192 | 45 |
| 36 | 8,100 | 89 | | | | |
| 52 | | | 1,700 | 212 | | |
| 54 | 10,000 | 183 | | | | |

EXAMPLE 5

Our novel magnesia is compared to magnesia known in the art to be useful in increasing the viscosity of polyester resins by intimately admixing each magnesia separately with a polyester available from Freeman Chemical Co. and known as Stypol 40-2417. The blending method is the same as that described in example 1. The magnesia used is known in the art, and are herein designated types A (previously defined) and "C." They are both finely powdered light calcined magnesia of neoprene compounding grade. The viscosity is measured at designated times after blending. Results are shown in Table V.

TABLE V

| Weight percent magnesia in resin | Type of magnesia, viscosity, poise | | | | | |
|---|---|---|---|---|---|---|
| | Type "A" magnesia | | Novel magnesia | | Type "C" magnesia | |
| | 1 | 2 | 1 | 2 | 1 | 2 |
| Hours at ambient temperature: | | | | | | |
| 4 | 77 | 89 | 70 | 90 | 57 | 67 |
| 8 | | | 96 | 160 | 62 | 79 |
| 24 | 112 | 300 | 180 | 760 | 114 | 265 |
| 48 | 188 | 1,070 | 340 | 1,840 | 154 | 500 |
| 96 | | | 690 | 6,700 | 210 | 1,160 |
| 144 | 325 | 4,650 | 1,200 | 10,000 | | 3,400 |

EXAMPLE 6

Magnesium oxide containing 92.4 percent MgO, having an iodine number of 152 (m.eq./100 g.), an average particle size of 18.5 microns (MSA Whitby method) and a loose bulk density of 24 pcf, is fed to a Jetomizer Model 0405CC fluid-energy jet mill at a rate of 400 lbs./hour. Air preheated to 500° F. is passed through a jet into the mill at a jet pressure of 90 p.s.i.g. and at a rate of 550 s.c.f.m. (standard cubic feet/minute). The milled magnesia is collected in a cyclone and fed into a bin for packaging. It contains 92.3 percent MgO, has an iodine number of 150, an average particle size of 0.47 microns and a loose bulk density of 7 p.c.f.

It should be understood that although this invention has been described with reference to particular embodiments thereof, changes and modifications may be made which are within its intended scope and it should be limited only by the language of the appended claims.

What is claimed is:

1. A composition of matter having improved physical properties comprising a polyester resin and 0.2–10 weight percent of jet-milled magnesia having an iodine number greater than 100, prior to jet milling, a particle size of 0.1–7 microns, and containing about 86–96 weight percent of MgO.

2. A composition of claim 1 characterized in that the polyester resin is one prepared from a dicarboxylic acid, a polyol and a monomeric polymerizable compound containing an ethylenic bond, and in that the composition contains 0.4–3 weight percent of magnesia having an iodine number greater than 100, a particle size of 0.4–1.2 microns, and containing about 89–94 weight percent of MgO.

3. A process for preparing the composition of claim 1 that comprises treating a polyester resin with 0.2–10 weight percent of magnesia having an iodine number greater than 100, a particle size of 0.4–3 microns, and containing about 86–96 weight percent of MgO.

4. A process for preparing the composition of claim 2 that comprises treating a polyester resin prepared from a dicarboxylic acid, a polyol and a monomeric polymerizable compound containing an ethylenic bond, with 0.4–3 weight percent of magnesia having an iodine number greater than 100, a particle size of 0.4–1.2 microns, and containing about 89–94 weight percent of MgO.